June 27, 1967 J. B. BREWSTER 3,328,569
SQUARE ROOT EXTRACTING NETWORK
Filed Nov. 14, 1963 4 Sheets-Sheet 1

INVENTOR.
JEROME B. BREWSTER
BY
John F. Luhrs
ATTORNEY

June 27, 1967  J. B. BREWSTER  3,328,569
SQUARE ROOT EXTRACTING NETWORK
Filed Nov. 14, 1963  4 Sheets-Sheet 2

INVENTOR.
JEROME B. BREWSTER
BY John F. Luhrs
ATTORNEY

June 27, 1967      J. B. BREWSTER      3,328,569
SQUARE ROOT EXTRACTING NETWORK
Filed Nov. 14, 1963      4 Sheets-Sheet 3

INVENTOR.
JEROME B. BREWSTER
BY
ATTORNEY

June 27, 1967    J. B. BREWSTER    3,328,569
SQUARE ROOT EXTRACTING NETWORK
Filed Nov. 14, 1963    4 Sheets-Sheet 4

INVENTOR.
JEROME B. BREWSTER
BY
ATTORNEY

United States Patent Office 3,328,569
Patented June 27, 1967

3,328,569
SQUARE ROOT EXTRACTING NETWORK
Jerome B. Brewster, Cleveland, Ohio, assignor to Bailey Meter Company, a corporation of Delaware
Filed Nov. 14, 1963, Ser. No. 323,764
7 Claims. (Cl. 235—193.5)

This invention relates to electrical networks, and, more particularly, to an electronic network or system which provides an output signal which is proportional to the square root of an input signal.

There are numerous applications for a square root extracting network. For example, in accurately measuring fluid flow through a conduit, a differential pressure is developed by the use of a nozzle, or orifice. In measuring this differential pressure, the pressure is measured on each side of the orifice. The relationship between fluid flow and differential pressure follows the square root law.

In equation form:

$$f = k\sqrt{P_1 - P_2}$$

where $f$ is flow, $k$ is a constant, $P_1$ and $P_2$ are pressures on either side of the nozzle. The differential pressure caused by the fluid flow is relatively easy to convert to an electric signal. The accurate extraction of the square root of this electric signal to determine the fluid flow is, however, relatively difficult. For example, networks are known for the extraction of square roots of an input signal, which roots represent only a rough approximation of the true square root. Other networks are known which produce a more accurate square root outuput signal but these circuits are unstable for ambient temperature and supply voltage changes. Further, these networks are relatively expensive to construct if provision is made for producing the required degree of accuracy and stability.

A square root extracting network should preferably be easily adapted to handle various ranges and levels of input signals as well as input signals varying in direct functional relation with the measured variable or in inverse functional relation. Further, the square root extracting network should be easily adjusted to produce an output signal having range limits equal to or different than the range limits of the input signal. As specific examples of the foregoing generalties, the input signal may vary, for example, between limits of −10 volts to +10 volts for a change in fluid flow from zero to max., or may vary from +10 volts to −10 volts depending upon the type of input signal generator employed. In other cases the input signal may vary, for example, between +3 volts to +20 volts, or the reverse. Further, it may, in some cases, be desirable to have a signal output range of from −10 volts to +10 volts for the same input signal range and in other cases an output signal range of say from −10 volts to +10 volts for an input signal range of from −5 volts to +5 volts, or some other specified input signal range.

Accordingly, it is an object of this invention to provide a square root extracting network of universal application adapted to accommodate a wide variety of ranges and levels of input signals varying directly or inversely with the measured variable.

It is further an object of this invention to provide a square root extracting network which may generate an output signal having the same or different range limits than the input signal.

It is accordingly still another object of this invention to provide a square root extracting network for accurately extracting the square root of an input signal which varies between positive and negative values.

Another object of this invention is to provide a simplified square root extracting network for producing an output signal which accurately represents the square root of the input signal.

It is a further object of this invention to provide a square root extracting network which is relatively insensitive to changes in temperature and supply voltage.

It is another object of this invention to provide a square root extraction system which accurately extracts the square root of an input signal which varies over a relatively wide range.

It is another object of this invention to provide a square root extraction system which accurately provides an output signal which is a representation of the square root of the input signals for wide variations in line voltage.

It is a further object of this invention to provide a square root extraction system which can be readily adjusted for a high degree of accuracy with relatively few controls.

Briefly, in accordance with aspects of this invention, I have discovered that a square root extractor network or system for accurately providing an output signal indicative of the square root of the input signal can be provided by a relatively simple and economical network employing one or more input stages, a difference amplifier connected to the output of the input stages, a high-gain amplifier connected to the output of the difference amplifier, and a squaring circuit connected between the output of the high-gain amplifier and one of the inputs of the difference amplifier. Advantageously, the input stage, or stages, includes at least one compensating stage and may include both a divider, or sub-multiplier, stage and a summing stage, which stages compensate for the factors by which the actual output signal of the squaring circuit departs from direct proportionality with the square of the network input signal.

In accordance with more specific aspects of this invention, I provide a square root extracting network with a divider stage comprising a voltage divider, which stage permits a predetermined fraction of the input voltage to be taken off and fed to the next stage, which may be a summing stage. In this specific illustrative embodiment, I employ a divider stage which takes one-half of the signal to be applied to the subsequent compensating stage and the subsequent compensating stage is a summing stage, or voltage adding stage, which adds to this input signal a constant potential. The output of these stages is related to the output of the squaring circuit such that the combination of the sub-multiplier, or divider, stage and the summing stage compensates for deviations of the squaring circuit from direct proportionality with the square of the signal which is applied to the input terminal of the network.

In accordance with still other features of this invention, I employ in a squaring circuit, which is connected in a feedback path between a high-gain amplifier and one of the input terminals of a difference amplifier, an auctioneer circuit which has a pair of input terminals and an output terminal and delivers to its output terminal the greater of the signals applied to its two input terminals. To one input terminal is applied the output signal of constant amplitude generated by a sawtooth oscillator, which amplitude may correspond to the range of amplitudes of the network input signal. The other input terminal of the auctioneer circuit is connected to the output of the high-gain amplifier. The output of the auctioneer circuit, which is representative of the greater of the two input signals, is fed to one of the input terminals of the difference amplifier.

In accordance with still other aspects of this invention, the feedback network includes a stabilizing network which prevents the generation of oscillations through the feedback network.

It is a still further feature of this invention to employ, in a square root extracting network, inexpensive transistors which exhibit high leakage currents and to couple stages of the transistors together by a low resistance circuit which prevents a shift in direct current voltage level due to these leakage currents. Thus, the network generates an output signal which is an accurate representation of the square root of the input signal.

Yet another feature of this invention is to employ a pair of transistors in a difference amplifier in which voltage changes caused by the temperature changes of one of the transistors cancels the voltage change caused by temperature changes of the other transistor. Further, the difference amplifier is provided with a transistor emitter resistance which stabilizes the operating point of the difference amplifier. Still further, the connection of the transistors of the difference amplifier produces leakage current changes which cause opposing drifts, which transistors thus compensate for each other.

These and various other objects and features of the invention will be more clearly understood from a reading of the detailed description of the invention in conjunction with the drawings in which.

Figure 1:
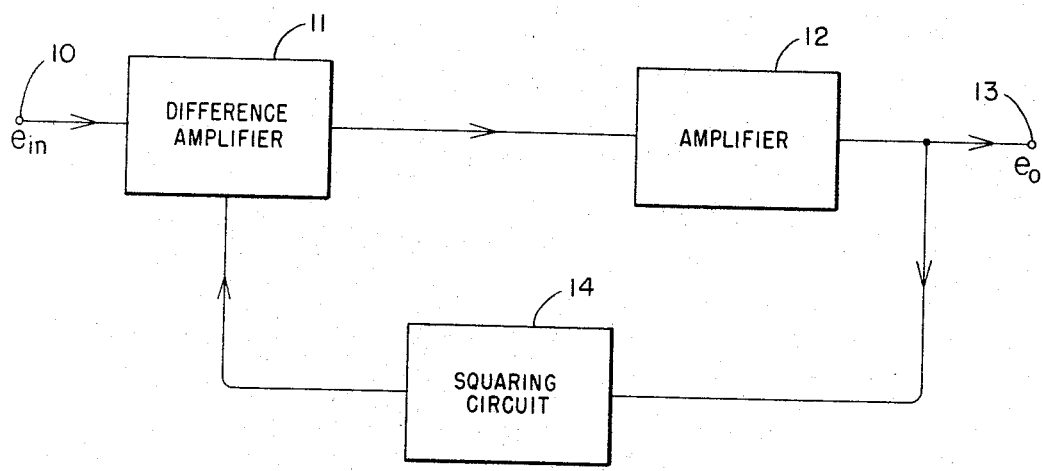
FIG. 1 is an elementary block diagram of a square root extracting network.

Referring now to FIG. 1, there is depicted, in elementary block form, a square root extracting network. This network includes an input terminal 10 to which an input signal, $e_{in}$, is applied to a difference amplifier 11 as one of the two inputs thereof. The output of the difference amplifier is fed to a high-gain amplifier 12 and the output of amplifier 12 is connected to a network output terminal 13. A feedback path is provided between the output of amplifier 12 and one of the inputs to difference amplifier 11, which feedback path includes a squaring circuit 14. In this network, the output signal $e_o$ at terminal 13 is proportional to the square root of the input signal $e_{in}$ at terminal 10.

Stated algebraically:

$$e_o = K_1 \sqrt{e_{in}} + K_2 \quad (1)$$

where $K_1$ and $K_2$ are constants.

Figure 2:
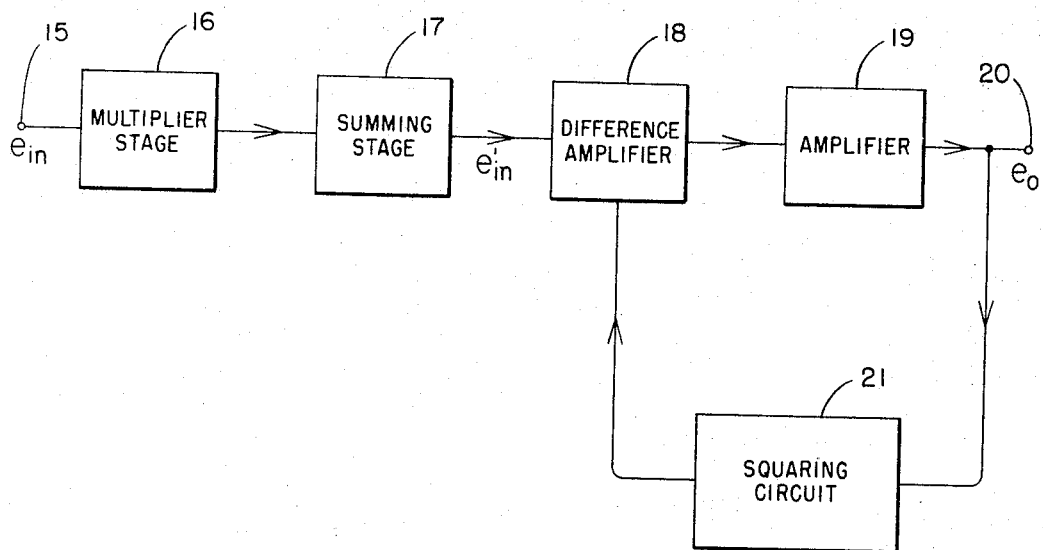
FIG. 2 is a block diagram of a square root extracting network according to one specific embodiment of this invention.

Shown more specifically the square root extracting network according to this invention is represented in block form in FIG. 2. This figure shows an input terminal 15 to which the input signal $e_{in}$, such as the pressure differential indicating signal, is fed, the square root of which is desired to indicate fluid flow. Input terminal 15 is connected to a multiplier stage 16 which delivers a predetermined fraction of its input signal to its output. The output of multiplier stage 16 is connected to the input of a summing stage 17, which summing stage adds a direct current potential to the signal applied to its input terminal. The output of summing stage 17, $e'_{in}$, is applied to one of the two input terminals of difference amplifier 18 and the output of difference amplifier 18 is fed to a high-gain amplifier 19. The output of amplifier 19 is fed to a network output terminal 20 and is also fed through a feeback loop which includes a squaring circuit 21 to the other input terminal of difference amplifier 18. Advantageously, the predetermined factor by which multiplier stage 16 multiplies the signal applied to network input terminal 15 is that required to produce a given range in output signal ($e_o$) for a given range in input signal ($e_{in}$). Also advantageously, summing stage 17 adds a voltage to the input signal, which added voltage is required to produce desired range limits in output signal ($e_o$) for given range limits in input signal ($e_{in}$). Stated in another manner, it may be desirable that the range limits of $e_o$ be the same at the range limits of $e_{in}$, for example, that the range limits of $e_o$ be $-10$ volts to $+10$ volts for $e_{in}$ range limits of $-10$ volts to $+10$ volts; and that between these limits the output signals vary in direct proportion to the square root of the input signal. The squaring circuit produces a feedback voltage, however, having a different range than the desired range in output signal and which is displaced upwardly or downwardly from the desired maximum and minimum values. To compensate for this difference, the network input signal is first multiplied (to compensate for the fractional multiplier) and a direct current potential is then added (to compensate for the constant). Thus, with this novel arrangement, the factors of multiplier stage 16 and summing stage 17 are related to the operational factors of the squaring circuit 21. With this novel arrangement of square root extracting network, a square root is extracted and delivered to the output terminal 20, which square root is an accurate representation having predetermined maximum and minimum values of the square root of the input signal applied to terminal 15.

Figure 3:
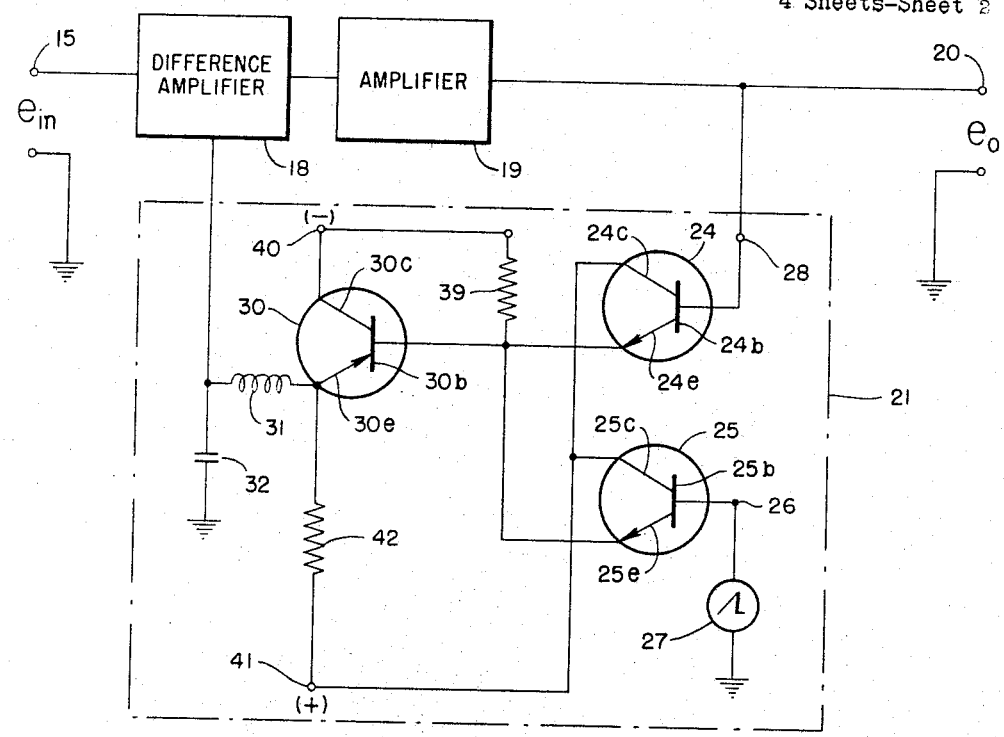
FIG. 3 is a simplified schematic representation of a squaring circuit empolyed in one illustrative embodiment of this invention.

Referring now to FIG. 3, there is depicted, in schematic and pictorial form, a squaring circuit, according to this invention, shown connected between one of the input terminals of difference amplifier 18 and the output of high-gain amplifier 19, as depicted in block form in FIG. 2. The squaring circuit 21 includes a pair of transistors 24, 25 connected with two corresponding pairs of electrodes in parallel to define a part of an auctioneer circuit, which circuit transmits the greater of two signals applied to its respective input terminals in a manner which will be subsequently described. One of the input terminals 26 of the auctioneer circuit is connected to a source of constant amplitude sawtooth waves 27. The other input terminal 28 of the auctioneer circuit is connected to network output terminal 20 to receive the output signal from amplifier 19. The auctioneer circuit includes transistor 30, connected as an emitter follower amplifier. The output of transistor 30 is fed through a low-pass filter which includes an inductance 31 and a capacitance 32, the function of which will be subsequently described in detail. Transistors 24, 25 are of NPN type, each having an emitter, a base, and a collector electrode. For example, transistor 24 has an emitter 24e, a base 24b, and a collector 24c, while transistor 25 has an emitter 25e, a base 25b, and a collector electrode 25c. Emitter electrodes 24e, 25e are connected together and connected through a suitable biasing resistor 39 to a terminal 40 which, in turn, is connected to a source of negative potential, not shown. Collector electrodes 24c, 25c are connected together and are connected to a terminal 41, which terminal is connected to a positive source of potential, also not shown. Collector 30c is connected to negative source terminal 40 and emitter 30e is biased from positive source terminal 41 through resistor 42.

Figure 4:
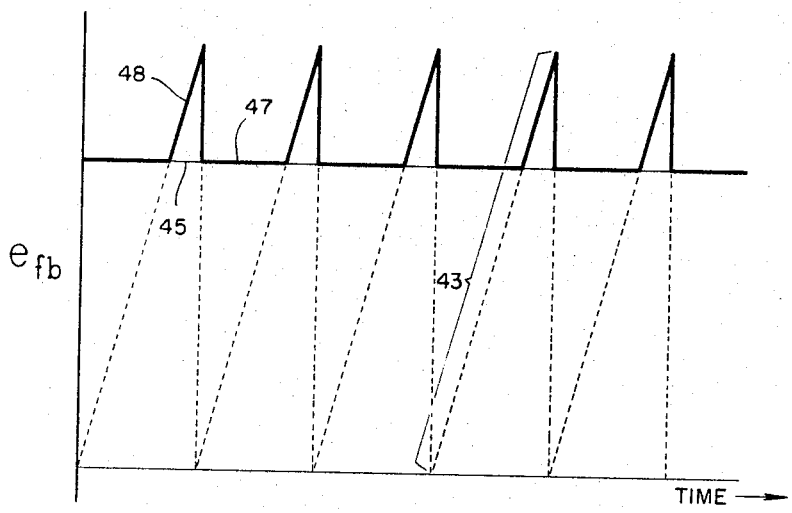
FIG. 4 is a time plot of the signals occurring in the squaring circuit of FIG. 3.

Advantageously, this auctioneer circuit is biased by the potentials applied to terminals 40 and 41 such that the output at the common emitter amplifier 30 will represent the greater of the two input signals applied to terminals 28 and 26. In other words, if the output signal from amplifier 19 at any instant is greater than the sawtooth sweep signal from generator 27, then the output of the auctioneer circuit will correspond to the output of amplifier 19. When, however, the sawtooth wave from sawtooth source 27 exceeds the output of amplifier 19, then the auctioneer circuit will produce an output corresponding to the sawtooth wave. These principles are best illustrated with reference to FIG. 4.

As therein depicted, the sawtooth wave is illustrated in combined dotted and solid form and designated 43. The output level of amplifier 19 is arbitrarily chosen as a value indicated by 45, and during the period that the output of amplifier 19 is at value 45, the feedback voltage, designated by the solid line 47, will be either the constant value 45 or a varying value corresponding to the spikes 48 of the sawtooth wave 43. This feedback signal is feed from the emitters $24e$, $25e$ to the base electrode $30b$ of transistor 30 of the emitter follower stage. Advantageously, transistor 30 provides a base-to-emitter drop which is opposite in direction to that of transistors 24, 25 thus insuring temperature stability. The output of transistor 30 is fed from the emitter electrode through inductance 31 and applied across capacitor 32 to produce a direct current feedback signal having a value equal to the average of output 47 and 48 from the auctioneer circuit and which is fed to one of the two input terminals of difference amplifier 18.

With the amplitude of the sawtooth wave equal to the range $e_o$, that is equal to ($e_o$ max. $-e_o$ min.), it is apparent from the geometry of FIG. 4 that $e_{fb}$ avg. is:

$$e_{fb} \text{ avg.} = \frac{1}{2}\left[\frac{(e_o - e_o \text{ min.})^2}{(e_o \text{ max.} - e_o \text{ min.})} + (e_o \text{ max.} - e_o \text{ min.})\right] \quad (2)$$

Now the average $e_{fb}$ necessary for the output signal ($e_o$) to be proportional to the square root of the input signal ($e_{in}$) is:

$$e_{fb} \text{ avg.} = \frac{(e_o - e_o \text{ min.})^2}{(e_o \text{ max.} - e_o \text{ min.})} \quad (3)$$

An inspection of Equations 2 and 3 indicates that the actual $e_{fb}$ avg. differs from the required $e_{fb}$ avg. by a multiplying factor (½) plus a constant ($e_o$ max. $-e_o$ min.). As explained with reference to FIG. 2, to obtain an output signal ($e_o$) proportional to the square root of the input signal ($e_{in}$), I preferably modify $e_{in}$ in a multiplier stage by this multiplying factor and in a summing stage by the constant to produce an $e'_{in}$ which is compared against the actual $e_{fb}$ avg. to thus produce an output signal ($e_o$) proportional to the square root of the input signal ($e_{in}$).

The above analysis presumes that the range in the output signal ($e_o$ max. $-e_o$ min.) is to be the same as the range in input signal ($e_{in}$ max. $-e_{in}$ min.) and that the ranges have the same bias above or below a given base potential, such as ground potential. It will be apparent that by conditioning $e_{in}$ as required in suitable modifying stages any desired relationship can be obtained while maintaining the output signal proportional to the square root of the input signal. Further, by providing generators producing different wave forms various other non-linear functional relationships may be obtained between the input and output signals.

Figure 5:
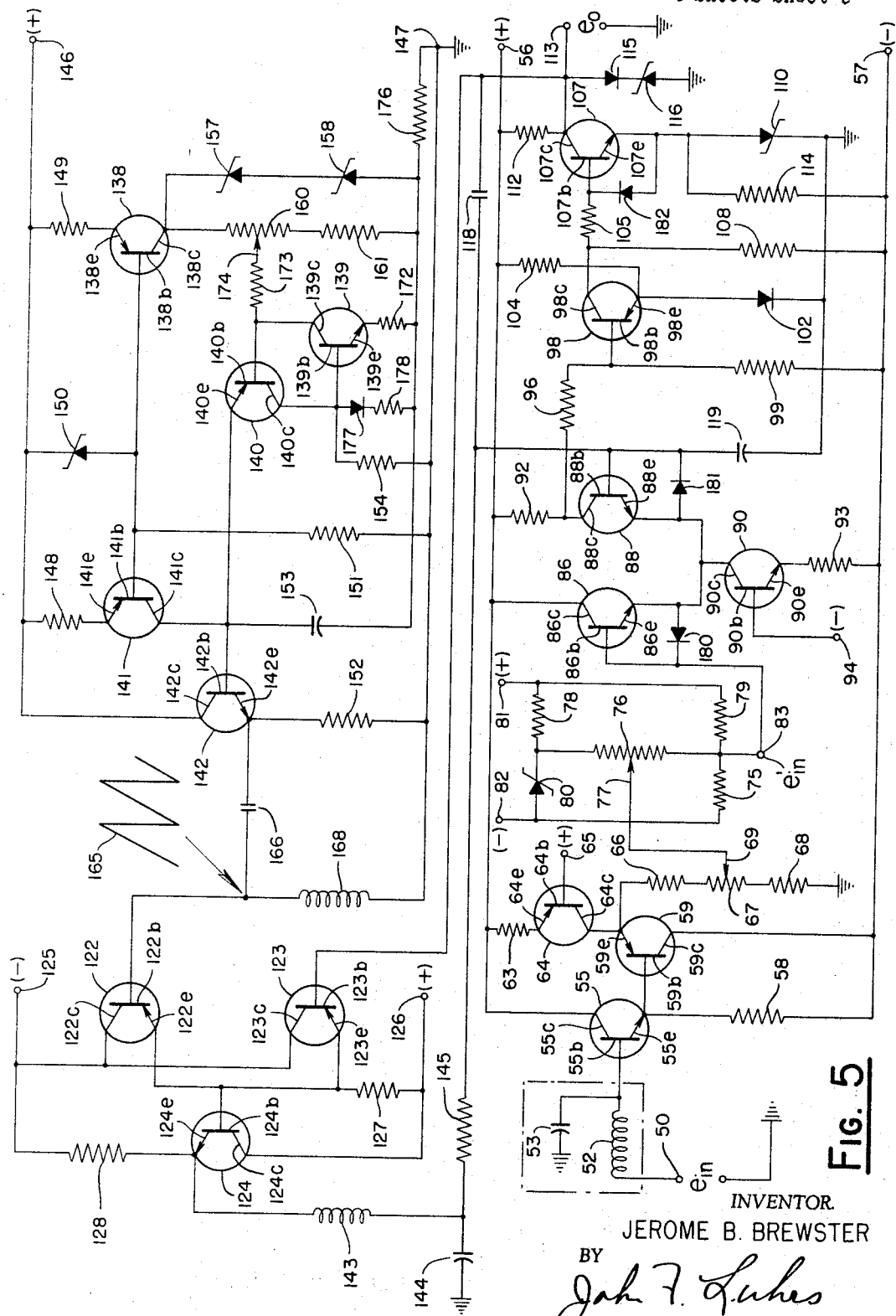
FIG. 5 is a schematic representation of one illustrative embodiment of this invention empoyed for extracting square roots of signals varying inversely with the measured variable.
Figure 6:
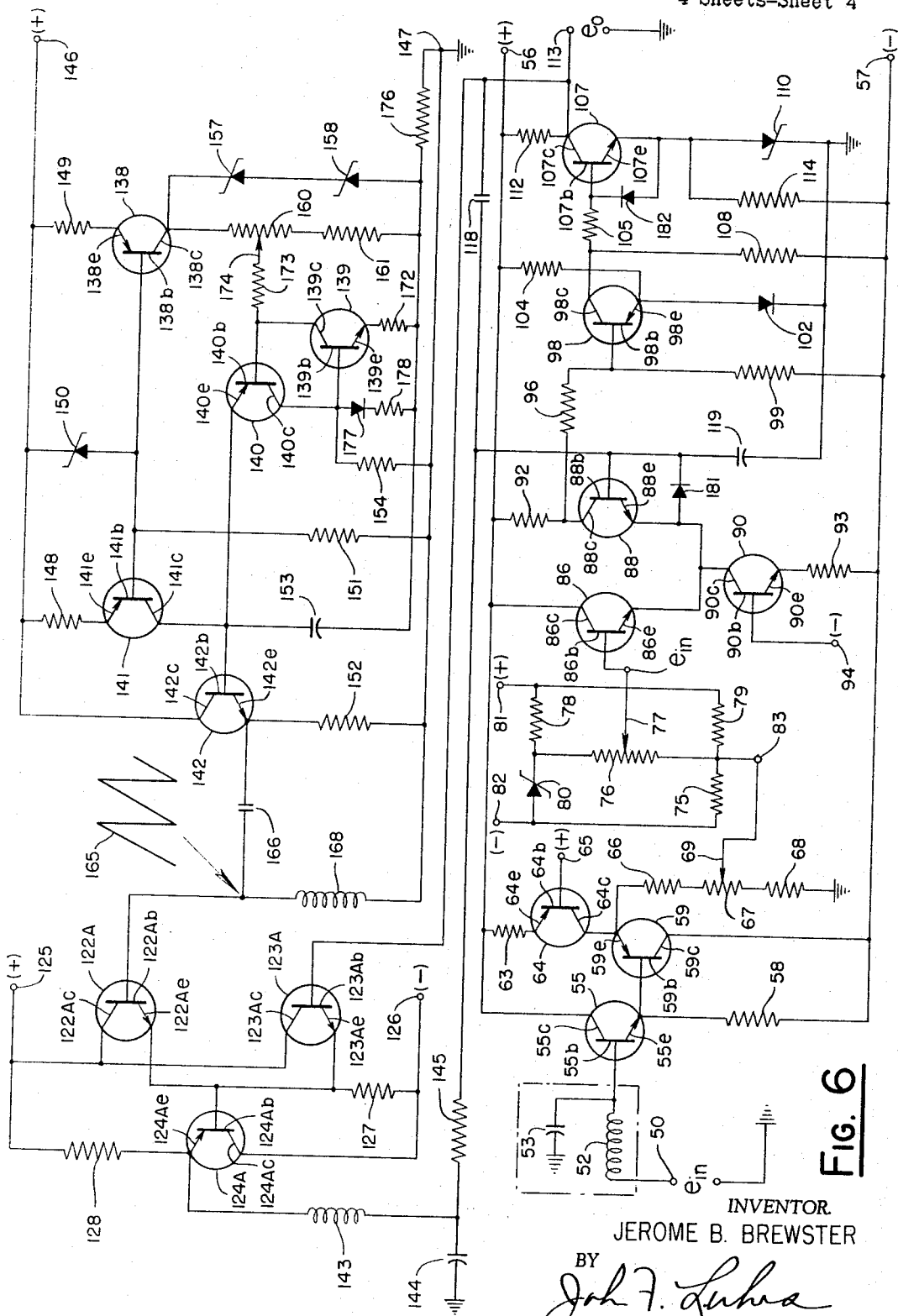
FIG. 6 is similar to FIG. 5 but shows the modifications required for my square root extracting network to accept input signals varying directly with the measured variable.

Referring now to FIG. 5, there is depicted, in schematic form, a square root extractor according to a preferred embodiment of this invention. The network shown is arranged to accept an input signal varying inversely with the measured variable. A network arranged to accept an input signal varying directly with the measured variable is shown in FIG. 6. The network shown in FIG. 5 includes a network input terminal 50 to which an input signal $e_{in}$ is applied, which signal is the one with respect to which the square root is to be extracted. The signal $e_{in}$ is fed from terminal 50 through an input network comprising an inductance 52 and a capacitance 53. This is a conventional low-pass filter for eliminating high frequency components from the signal $e_{in}$. The output of the filter is applied to the base $55b$ of a transistor 55, which includes an emitter electrode $55e$ and a collector electrode $55c$. A source of positive and negative potential is connected to terminals 56, 57 respectively. Emitter electrode $55e$ is biased through a resistor 58 from terminal 57 and collector $55c$ is connected to terminal 56. The output of transistor 55 is taken from emitter $55e$ and fed to a base electrode $59b$ of a transistor 59, which includes an emitter electrode $59e$ and a collector electrode $59c$, the latter being connected to terminal 57. Transistors 55 and 59 define a pair of complementary emitter follower stages employed primarily for matching the output impedance of a transducer connected to the terminal 50, which transducer is not shown, to the input impedance of the square root extractor network. The impedance matching stage includes a transistor 64 which has an emitter $64e$ connected through a resistor 63 to terminal 56 and a collector $64c$ connected to the emitter $59e$ of transistor 59 to constitute a constant current bias source for the emitter electrode $59e$, thereby accurately controlling the drift of the transistor 59.

This constant current source includes transistor 64 and the potential from positive source terminal 65 coupled to the base $64b$ of transistor 64. By the use of this constant current bias source, the collector current variations of transistor 59 are small and the linearity of the output of transistor 59 is very good.

The output of transistor 59 is taken from the emitter $59e$ and applied to a multiplier stage, defined by a voltage divider circuit. This circuit includes a resistor 66, a variable resistor 67, and a resistor 68, serially connected between the emitter $59e$ and ground. Resistor 67 constitutes one of the three points on the network at which adjustments to achieve an accurate square root signal may be made. The signal from the divider is taken from an adjustable tap 69 on resistor 67 and applied to the input of the summing stage. In this specific illustrative embodiment, resistors 66 and 68 are equal in value and, therefore, if the adjustable tap 69 is approximately centered on the resistance 67, the output potential applied to the next subsequent stage is approximately half of the input signal applied across the voltage divider circuit 66, 67 and 68.

The next stage in the extractor network after the multiplier stage is a voltage adding stage in which a direct current potential is added to the incoming signal. In this particular instance, the voltage adding stage comprises a bridge of four resistors 75, 76, 78 and 79, and a Zener diode 80. A suitable source of positive and negative potential is connected to a pair of bridge terminals 81, 82. This bridge might be designated a floating impedance cancellation bridge and the bridge includes the temperature compensated Zener diode 80 which accurately maintains the potential across the bridge at a predetermined value and compensates for variations in temperature.

In order to achieve a high degree of precision in square root extraction, an accurate stability must be maintained with respect to ambient temperature. For example, in this illustrative embodiment, a stability of plus or minus one-half of one percent was obtained for a temperature range of 40 to 140° F. In order to maintain this stability, any reference voltage which is added in series with the input signal must be stable to a value of plus or minus one-tenth of one percent with respect to temperature and line voltage. In this specific embodiment, the temperature coefficient of diode 80 is ±.15% stability for a 60° C. temperature swing. To compensate for line voltage effects, resistor 75 is selected to match the Zener diode impedance, which diode impedance is of the order of 15 ohms. Because the Zener impedance and temperature coefficient are dependent upon Zener current, the voltage level circuitry maintains Zener current at a value such that the diode impedance and temperature coefficient are midway of their rated range. A movable tap 77 on resistor 76 constitutes the direct current signal level adjustment and is the second of only three adjustments to be made in obtaining an accurate square root output.

The output terminals of the voltage adding stage are defined by terminal 83 and ground and, at this point in the network, the signal constitutes $e'_{in}$, the modified input voltage, which is related to the signal as applied to terminal 50 by a multiplication factor and an addition constant. This signal at terminal 83 is applied to a base electrode 86b of transistor 86 of a difference amplifier which includes transistors 86, 88 and 90. The emitter 90e of transistor 90 is connected to terminal 57 through resistor 93, the collector 90c is connected to emitters 86e, 88e and the base 90b is connected to constant potential terminal 94 so that transistor 90 acts as a common emitter bias source for transistors 86, 88.

In this extractor network, transistors 86, 88 and their related circuitry, which define the difference amplifier network, are the most critical portions of the network and must therefore have highly stable characteristics. For this reason, transistors 86, 88 are connected at their emitters 86e, 88e, respectively, such that temperature changes cause phase-emitter voltage changes which are in opposition. Leakage current changes of transistors 86, 88 will produce opposite drifts if equal resistances are "seen" from each base, 86b, 88b. Base 86b sees the resistance bridge, just described, and the resistance seen by base 88b will be subsequently described. Transistor 90 is the emitter resistance of transistors 86, 88 and prevents drift from transient changes of operating point.

A resistor 92 and resistor 93 connect collector electrode 88c and emitter 90e of transistors 88, 90, respectively, to positive and negative potential terminals 56, 57 and the collector electrode 86c of transistor 86 is connected directly to terminal 56 to provide the necessary emitter collector bias for this difference amplifier. The other input terminal to the difference amplifier is defined by base electrode 88b of transistor 88. Difference amplifier 86, 88 delivers an output signal through collector electrode 88c, which output signal constitutes the greater of the signals applied to the bases 86b, 88b of transistors 86, 88 and this difference signal is applied through a resistor 96 to the base electrode 98b of transistor 98, which transistor is the first of two stages of a high-gain amplifier. The base electrode 98b of transistor 98 is connected to terminal 57 by means of a resistor 99. Transistor 98 includes an emitter electrode 98e connected to ground by a suitable diode 102 and connected to the source of positive potential at terminal 56 by means of a resistor 104. Collector 98c is connected to negative terminal 57 through resistor 103. Diode 102 constitutes a temperature compensating circuit for the amplifier stage which includes transistor 98. The output of transistor 98 is taken from collector electrode 98c and is applied through a resistor 105 to the base 107b of a transistor 107. Transistor 107 is the second stage of the high-gain amplifier and includes an emitter electrode 107e, which is connected to ground through a Zener diode 110 to closely regulate the emitter potential; and a collector electrode 107c, which is connected to positive terminal 56 by a resistor 112 to supply forward bias. Collector electrode 107c is connected directly to the extractor network output terminal 113. Emitter electrode 107e is connected to negative bias terminal 57 by means of a suitable resistor 114.

At $e_o$ max., that is the value of $e_o$ corresponding to $e_o$ min., the rate of change of $e_o$ approaches infinity which could result in instability and permit $e_o$ to rise to the potential of terminal 56. To prevent this a diode 115 and a Zener diode 116 connected between collector 107c and ground limits $e_o$ max. to a fixed value when $e_{in}$ is at or near $e_{in}$ min.

The network includes a squaring circuit which is connected in a feedback path between collector electrode 107c of transistor 107 and base electrode 88b of transistor 88. To prevent oscillation in the feedback path, a feedback stabilizing network is provided in the form of a capacitor 118 connected between collector electrode 107c and base electrode 88b and a second capacitor 119 connected between the base electrode 88b and ground. This stabilizing network provides sufficient high frequency degeneration to limit the high frequency gain of the square root extracting network.

The feedback network includes an auctioneer stage having transistors 122, 123 and 124 therein. Transistors 122, 123 are connected in parallel so that their bases 122b, 123b form the input terminals to the auctioneer circuit in a manner corresponding to transistors 24, 25 of FIG. 3. In other words, input signals are fed to the bases 122b, 123b of transistors 122, 123 and the output from these transistors is obtained at their parallel connected emitters 122e, 123e. A pair of collectors 122c, 123c of transistors 122, 123, respectively, is connected in parallel and to a terminal 125, which terminal is connected to a source of negative potential, not shown. Emitters 122e, 123e are connected to a terminal 126 through resistor 127, which terminal is connected to a source of positive potential, not shown. Thus, the potential applied to terminals 125, 126 biases transistors 122, 123.

The auctioneer stage includes transistor 124, which is an emitter follower stage corresponding to transistor 30 of FIG. 3 and has an emitter 124e connected through a resistor 128 to negative source terminal 125. Transistor 124 includes a collector electrode 124c connected to the source of positive potential at terminal 126.

One of the input signals to this auctioneer stage is applied from collector 107c of transistor 107 to the base electrode 123b of transistor 123. The other input signal to the auctioneer stage is applied from a sawtooth oscillator defined by transistors 138, 139, 140 and 141, the output of which is fed through an amplifier 142 and a coupling network, all of which will be subsequently described, to the base 122b of transistor 122. The auctioneer output signal at emitter 124e is fed through a low-pass filter including an inductance 143, a capacitor 144, and a resistor 145, to produce an averaged feedback voltage, to base electrode 88b of transistor 88, which transistor is a portion of the difference amplifier defined by transistors 88, 86, previously described. Advantageously, resistor 145 constitutes the base resistance for base electrode 88b and has a value such that bases 86b, 88b see equal resistances causing these transistors to produce equal and opposing drifts in response to leakage current changes.

In the sawtooth oscillator section, potential is supplied from a pair of terminals 146, 147 to which are supplied positive potential and ground, respectively, from a source, not shown. A pair of biasing resistors 148, 149 are connected between terminal 146 and the emitters 141e, 138e of transistors 141, 138, respectively, to provide emitter bias. A Zener diode 150 is connected between terminal 146 and the bases 138b, 141b of transistors 138, 141 to closely regulate the potential of emitter-base junction. Zener diode 150 is also connected to a resistor 151, which, in turn, is connected to terminal 147 to thus constitute a regulated voltage divider. Transistor 142 is an emitter-follower amplifier provided with an emitter resistor 152 which is connected between the emitter electrode 142e and ground and collector 142c is connected to terminal 146. Transistor 139 is provided with a base biasing resistor 154. Transistor 141 acts as a constant current generator stage providing a constant charging current source to charge a capacitor 153. The generator permits the capacitor to charge to a potential corresponding to the desired amplitude of the sawtooth wave form. Zener diode 150 provides a constant bias for the current generator 141. The resistor 151 provides a current path for the Zener current and determines the degree of regulation of the Zener voltage with line volt- The circuit which discharges capacitor 153 includes transistors 139, 140 connected to a regulated voltage supply. Transistor 140 acts as a comparator switch and has an emitter electrode 140e connected to the capacitor 153, a base electrode 140b connected to a Zener regulated reference voltage source and to a collector 139c, and a collector electrode 140c connected to base 139b of transistor 139. The reference voltage source includes a pair of Zener diodes 157, 158 and a voltage divider network including a pair of resistors 160, 161. Also included in the circuit of comparator switch of transistor 140 is a Zener reference current generator including transistor 138 and associated resistor 149 connected to terminal 146 to bias emitter 138e. If the voltage across capacitor 153 is less than the voltage across Zener diodes 157, 158, the comparator switch transistor 140 is open, but when capacitor 153 charges through transistor 141 to a value equal to the potential across Zener diodes 157, 158, comparator switch transistor 140 closes and capacitor 153 discharges. The output of the comparator switch, as obtained from emitter electrode 140e of transistor 140 is, of course, a sawtooth wave as indicated by the sawtooth wave form 165, which sawtooth wave form is amplified by transistor 142 and is coupled through capacitor 166 and inductance 168 to the base electrode 122b of auctioneer stage transistor 122.

By providing a constant current supply comprising transistor 138 and diode 150 for the temperature compensated Zener diodes 157, 158, the comparison voltage as applied to the base 140b of transistor 140 is not affected by line voltage or temperature changes, thus producing a well regulated sawtooth amplitude.

Through regenerative action, the collector current of transistor 139, through its collector 139c, tends to saturate and short circuit capacitor 153 through transistor 140. In other words, while transistor 140 is conducting, it acts as a closed circuit path for the discharge of capacitor 153 through transistor 139 and, specifically, through the emitter 139e, collector 139c, and a resistor 172. Resistor 172 will limit the discharge current and a resistor 173 decouples the reference supply upon discharge. Advantageously, resistor 160 has an adjuster tap 174, the adjustment of which adjusts the slope of the sawtooth wave. This tap is the last of the adjustments required to produce an accurate square root output signal.

The comparator switch, which includes transistor 139, is provided with a bypass circuit including a diode 177 and a resistor 178 connected between the base electrode 139b of transistor 139 and the connecting point between resistor 161 and a resistor 176. Diode 177 and resistor 178 allow some of the collector current of transistor 140 to flow to the connecting point between resistors 161, 176 instead of into the base of transistor 139. This arrangement allows a wide range of sawtooth amplitude adjustment with no stability problems. Collector electrode 140c is connected to ground through resistor 154.

When capacitor 153 is discharged, the base-emitter of transistor 140 reverts to normal reverse bias and capacitor 153 begins to charge again. The actual sawtooth wave present at the collector of transistor 141 is biased to allow turn-on voltage for the following emitter follower stage which includes transistor 142. The voltage reference of the sawtooth is provided by transistor 141 which controls current flow through resistor 176. Transistor 142 acts as a buffer amplifier to isolate the sawtooth generator from its output load and capacitor 166 eliminates the direct current voltage level of the sawtooth wave and couples the sawtooth wave to an inductive load. The wave form appearing across inductance 168 is a linear sawtooth having a frequency in the order of 2 kcs. The inductance 168 is used as a sawtooth load to provide small direct current resistance to the base 122b of transistor 122, avoiding collector-base leakage current problems, thus enabling the empolyment of relatively inexpensive germanium transistors in the auctioneer stage.

In order to prevent damage to the square root extractor network from a short circuited output terminal 113, a group of three diodes 180, 181 and 182 are connected between the emitter and base of transistors 86, 88 and 107 respectively. Diodes 180, 181 and 182 act as voltage limiters to limit the respective base-emitter voltages to that of a forward diode drop making the square root extractor network short circuit proof. The base-emitter voltage of transistor 98 assumes an inverse value for short circuit conditions but need not be limited because this voltage never exceeds the rated value. While it is possible to eliminate diodes 181, 182 by employing transistors 88, 107 with higher voltage ratings, the availability of these transistors at moderate cost and the relatively inexpensive diodes permit the use of this combination of transistors and diodes at less cost than the cost of higher voltage ratings transistors.

A Zener diode 110 limits $e_o$ to a fixed value when $e_{in}$ is at or near $e_{in}$ max., and prevents transistor 107 going to a saturated condition.

The square root extracting network may be converted, as shown in FIG. 6, to extract the square root of signals varying directly with the measured variable by making relatively few changes in the network. No changes are necessary in the impedance matching and divider stages. The polarity of the potential which is added to the input signal in the added stage is changed by connecting base electrode 86b of transistor 86 to the sliding tap 77 of resistor 76 instead of terminal 83 and by connecting the sliding tap 69 of resistor 67 to terminal 83 instead of to tap 77. This constitutes an interchange between the input and output circuits of the adder stage. Diodes 115, 180 and Zener diode 116 may be eliminated. The PNP transistor 122, 123 of FIG. 5 are replaced by NPN transistors 122A, 123A. NPN transistor 124 of FIG. 5 is replaced by PNP transistor 124A. The circuitry form of the auctioneer stage is identical with either type except that the potential supplied to terminals 125, 126 are reversed or interchanged. In other words, in FIG. 5 terminal 125 is connected to a negative source of potential and terminal 126 is connected to a positive source of potential while in FIG. 6 terminal 126 is connected to the negative source while terminal 125 is connected to the positive source.

These illustrative embodiments provide very accurate square root extraction over a wide range of conditions. For example, the embodiments of the network, as illustrated in FIGS. 5 and 6, maintained a calibration of 1.5% for line voltage variations of ±10% and temperature variations of from 40 to 140° F. The square root extracted is also accurate to ±0.5% over an output fluid flow range of 20–100%. Further, accurate adjustment of the network is obtained by adjusting only three controls, the "gain adjusting" tap 69 on resistor 67 of the multiplier stage, the "level or bias adjusting" tap 77 on resistor 76 of the adder stage, and "slope adjusting" tap 174 on resistor 160 in the sawtooth oscillator stage.

While I have shown and described certain illustrative embodiments of this invention, it is understood that the concepts thereof can be applied to other embodiments without departing from the spirit and scope of this invention.

What I claim is:

1. A square root extracting network having an input terminal and an output terminal, input signal compensating means, a difference amplifier having two input terminals and an output terminal, amplifier means coupled to the output terminal of said difference amplifier and having an output terminal coupled to said network output terminal, and a squaring circuit; said compensating means comprising a potential multiplier stage and a potential adding stage connected between said network input terminal and one of the input terminals of said differential amplifier and said squaring circuit comprising an auctioneer circuit having a pair of PNP transistors, each having an input terminal and each connected to a common output terminal to deliver at said common output terminal the greater of the two signals applied to their input terminals, an NPN transistor connected to said common output terminal and having an output terminal connected to the other input terminal of said difference amplifier, and a sawtooth oscillator connected to one of the input terminals of said pair of transistors, the other input terminal of said pair of transistors connected to the output terminal of said amplifier means.

2. In a square root extracting network having an input terminal and an output terminal, a signal multiplier stage coupled to said input terminal, a signal adder stage coupled to said multiplier stage, a difference amplifier having a first and a second input terminal, said first input terminal connected to said signal adder stage, an amplifier having an input terminal connected to said difference amplifier, and an output terminal coupled to said network output terminal and feedback generator means for generating a feedback signal varying in functional relationship to the square of the signal applied to said network output terminal including a pair of PNP transistors having two pairs of corresponding electrodes connected together, an NPN transistor having two of its electrodes coupled to one of said pairs of corresponding electrodes and the other of its electrodes coupled to the other of said pairs of corresponding electrodes and the second input terminal of said difference amplifier and a sawtooth oscillator having its output coupled to one of said PNP transistors, the output terminal of said amplifier coupled to the other of said PNP transistors.

3. In a square root extracting network having an input terminal and an output terminal, a signal multiplier stage coupled to said input terminal, a signal adder stage coupled to said multiplier stage, a difference amplifier having a first and a second input terminal, said first input terminal connected to said signal adder stage, an amplifier having an input terminal connected to said difference amplifier and an output terminal coupled to said network output terminal and feedback generator means for generating a feedback signal varying in functional relationship to the square of the signal applied to said network output terminal including a pair of NPN transistors having two pairs of corresponding electrodes connected together, a PNP transistor having one electrode coupled to one of said pairs of electrodes and having another electrode coupled to the other of said pairs of corresponding electrodes and the second input terminal of said difference amplifier, one of said pair of transistors coupled to said network output terminal and a sawtooth oscillator coupled to the other of said pair of transistors.

4. In an electrical network for delivering an output signal proportional to the square root of an input signal, the combination comprising, a difference amplifier having two input terminals and an output terminal, said input signal being applied to one of said input terminals, an amplifier having an input terminal coupled to the output terminal of said difference amplifier and an output terminal, squaring circuit means coupled between the output terminal of said amplifier and the other of said two input terminals of said difference amplifier, said squaring circuit means including, an auctioneer stage having a first and a second input terminal and an output terminal coupled to the other of said difference amplifier input terminals, a sawtooth oscillator having an output coupled to said first input terminals, said second input terminal coupled to the output terminal of said amplifier; said oscillator including a comparator switch, a charging current generator coupled to said switch, a capacitor coupled to said charging current generator and to said comparator switch, a reference current generator coupled to said comparator switch and a reference voltage source coupled to said comparator switch and to said current generator.

5. In a square root extracting network, a difference amplifier having a first and a second input terminal and an output terminal, amplifier means having an input terminal coupled to said output terminal and having an output terminal, and a signal squaring feedback generator; said generator including auctioneer means having a first and a second input terminal and an output terminal coupled to one of the input terminals of said difference amplifier for delivering to said difference amplifier the greater of two signals applied to said first and second auctioneer input terminals, a sawtooth generator coupled to said first auctioneer input terminal, said second input terminal coupled to said amplifier output terminal, said auctioneer means including, a pair of transistors, each having an emitter, a collector and a base electrode, said emitter electrodes connected in parallel, said collector electrodes connected in parallel, one of said base electrodes connected to said first auctioneer input terminal and the other of said bases connected to said second auctioneer input terminal, and a third transistor having an emitter, a collector and a base electrode, one of said third transistor electrodes coupled to one pair of parallel connected electrodes, another of said third transistor electrodes coupled to the other pair of parallel connected electrodes and the third transistor electrode coupled to the output terminal of said auctioneer means.

6. The combination according to claim 2 wherein said oscillator is coupled to one of said PNP transistors through a coupling circuit including a series capacitor and a shunt inductance.

7. The combination according to claim 3 wherein said oscillator is coupled to the other of said pair of transistors through a coupling circuit including a series connected capacitor and a shunt connected inductance connected to the other of said pair of transistors.

References Cited
UNITED STATES PATENTS

| | | | |
|---|---|---|---|
| 2,535,257 | 12/1950 | Berger | 235—193.5 X |
| 2,605,962 | 8/1952 | Berger | 235—193.5 |
| 2,702,857 | 2/1955 | Berger et al. | |
| 2,949,546 | 8/1960 | McVey. | |
| 3,043,516 | 7/1962 | Abbott et al. | 235—193.5 X |
| 3,113,274 | 12/1963 | Utt | 328—144 |

MALCOLM A. MORRISON, *Primary Examiner.*

J. RUGGIERO, *Assistant Examiner.*